Figure 1:
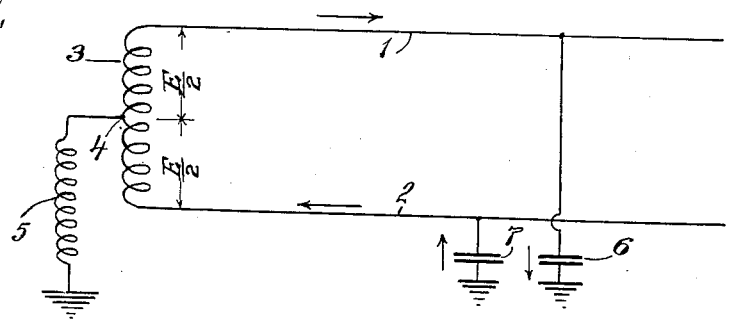

May 12, 1925.  
W. PETERSEN  
1,537,371  
PROTECTION OF ALTERNATING ELECTRIC CURRENT SYSTEMS  
Filed May 8, 1918  3 Sheets-Sheet 1

INVENTOR  
Waldemar Petersen  
BY Pennie, Davis, Marvin and Edmonds  
HIS ATTORNEYS

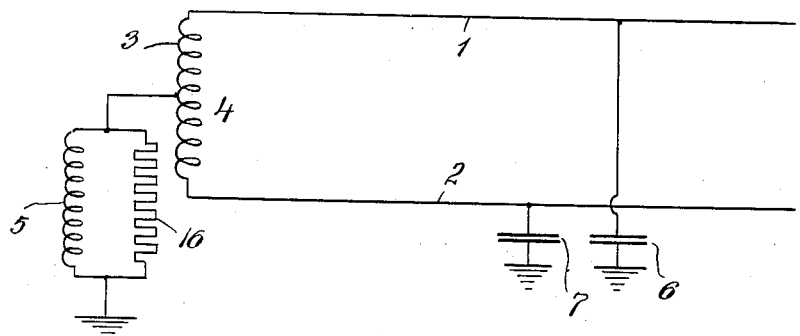
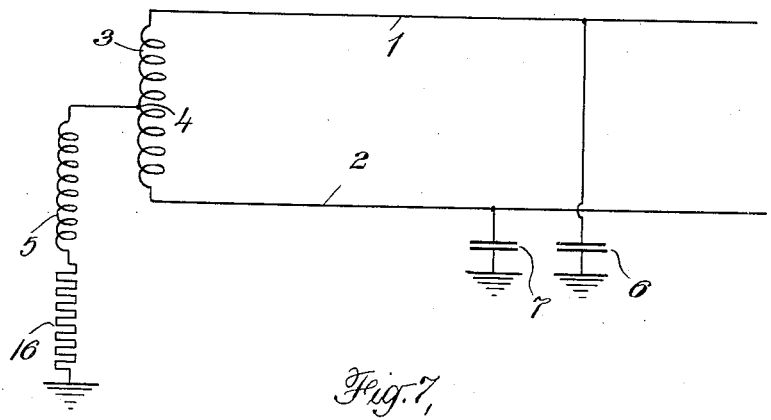
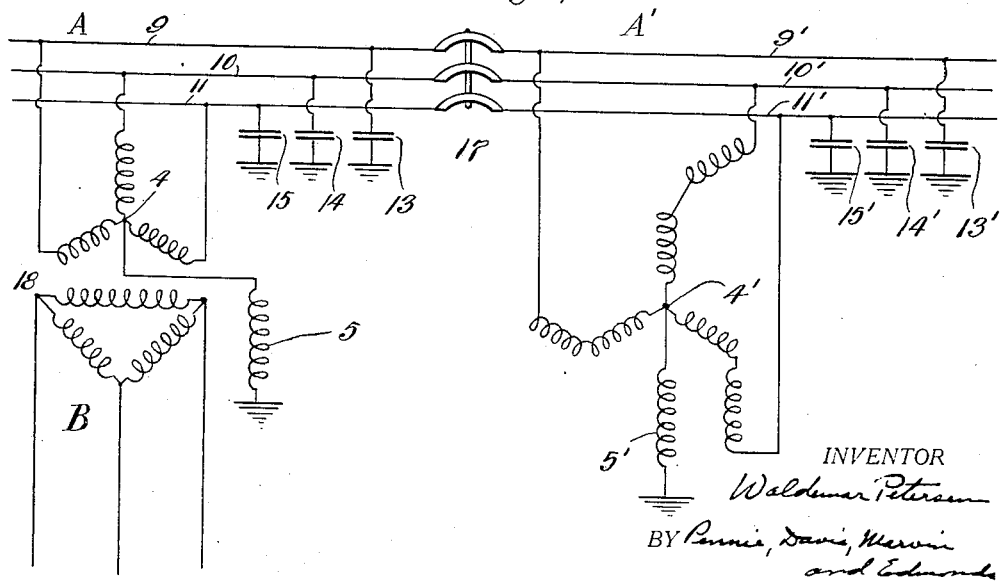

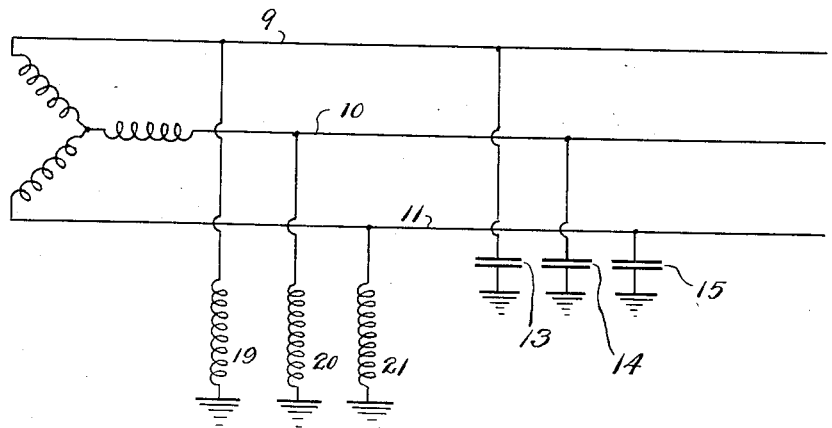
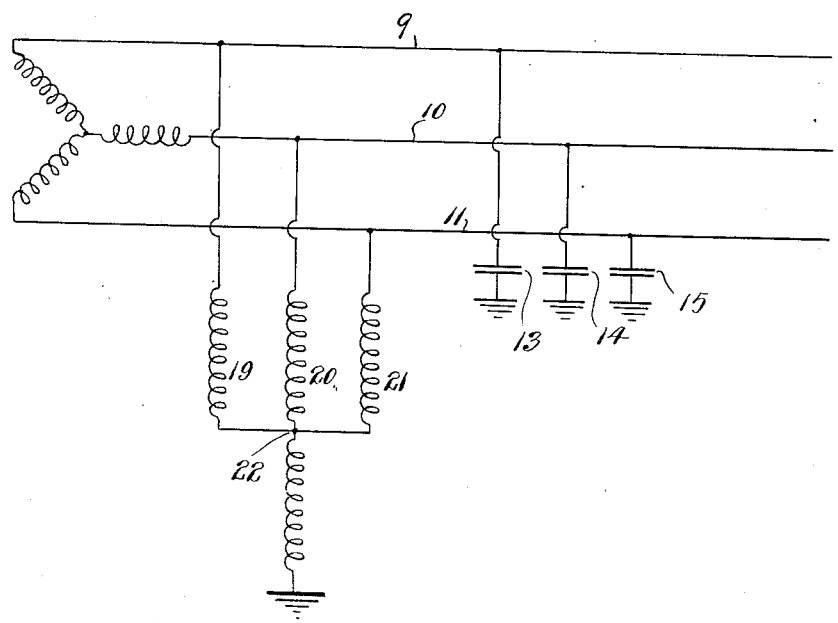

Patented May 12, 1925.

1,537,371

UNITED STATES PATENT OFFICE.

WALDEMAR PETERSEN, OF DARMSTADT, GERMANY, ASSIGNOR TO GENERAL ELECTRIC COMPANY, A CORPORATION OF NEW YORK.

PROTECTION OF ALTERNATING-ELECTRIC-CURRENT SYSTEMS.

Application filed May 8, 1918. Serial No. 233,387.

(GRANTED UNDER THE PROVISIONS OF THE ACT OF MARCH 3, 1921, 41 STAT. L., 1313.)

*To all whom it may concern:*

Be it known that I, WALDEMAR PETERSEN, a citizen of Germany, residing at Darmstadt, Germany, have invented certain new and useful Improvements in the Protection of Alternating-Electric-Current Systems (for which I have filed applications in Germany, January 23, 1917, Patent No. 304,823; Switzerland, December 3, 1917, Patent No. 92,812; Sweden, December 20, 1917, Patent No. 44,933; Norway, December 20, 1917, Patent No. 28,920; Netherlands, December 21, 1917, Patent No. 5,024; Italy, December 22, 1917, Patents Nos. 123,509 and 163,981; Austria, January 14, 1918, Patent No. 80,753; Hungary, January 16, 1918, Patent No. 74,543; France, January 23, 1918, Patent No. 545,573; Great Britain, February 12, 1918, Patent No. 113,154; Poland, June 20, 1920; Spain, June 22, 1920, Patent No. 74,175; Denmark, July 22, 1920; Czechoslovakia, October 21, 1920, Patent No. 4,510; and Japan, March 29, 1921), of which the following is a specification.

My invention relates to alternating current electric systems and more particularly to high tension systems of this character and has for its object a novel and improved means for suppressing ground or earth faults which may occur on such systems.

Alternating electric current systems, especially when operated at high voltages, are subject to earth faults arising from any one of many causes usually of a transient character. The most common causes of disturbance are due to birds, sleet, especially if heavy, falling trees, atmospheric excess voltages such as are produced by lightning discharges, etc., all of which tend to cause insulator flash-overs, thereby establishing a ground or earth fault on the system. In this way an earth fault current is established, this current being the capacity or charging current to ground taken by the ungrounded conductors. If the earth fault current is small, the flash-over arc may of itself die out, but if the intensity of the earth fault current exceds certain minimum values, an intermittent arc or so-called arcing ground is established. Even though the primary cause of the disturbance has disappeared, this intermittent arc tends to prevail with increasing intensity and is liable to produce short circuits, insulator failures, excess voltages and in general, damages causing interruptions in operation and interferences with the much desired continuity of service.

A satisfactory explanation of the difficulty in suppressing the arc and the cause of its considerable length even in case of poor earth connections has long been lacking, but further study of the problem has disclosed surprising conditions in that the grounded phase which was heretofore assumed dead, that is at ground potential when grounded, actually may show excess voltages of an intensity several times the phase voltage.

An intermittent ground, therefore, offers a most dangerous source of excess voltages with the arc dying out and flaring up again at least once every half period, for continuous or direct current voltage charges released upon the extinction of the arc, give the entire circuit a direct current voltage with respect to earth. These direct current voltages make possible the reignition of the arc only in conjunction with the operating voltage in the various phases. Since the direct current voltage charge with respect to earth disappears so slowly particularly in a well insulated system, the excess voltage caused by successive reignitions and extinctions of the arc attains a maximum value after several repetitions of the arc cycle due to the cumulative effect of the impressed direct current voltage charges. In three phase circuits, for example, it has been found that the excess voltage may attain a value in the sound phases of three to four times that of the normal phase or delta voltage and in the faulty phase 3 to 3.7 times that of the normal phase voltage.

The direct current voltage of the entire circuit with respect to earth assumes a value thereby which is 2 to 2.7 times the value of the phase voltage. The earth fault current being a reactive component of current leading the electromotive force by 90°, passes through its zero value at the maximum instantaneous value of the electromotive force of the system and, therefore, the cumulative continuous voltage charges superimposed on the operating voltage lead to reignitions of the arc even though the primary cause of the disturbance may have disappeared.

According to my invention, I suppress these excess voltages in their inception in that the earth fault current is neutralized or suppressed by one or more connections to ground through a neutral point or points of the system, the connection or connections being so dimensioned electrically as to have an inductive reactance of such a value as to substantially neutralize or compensate the leading earth fault current of the system by a lagging current due to the electromotive force of the system upon the occurrence of an earth fault.

It is not broadly new to provide a grounded neutral in alternating current electric systems as this has been done in order to lead static charges from the line and protect the system against high voltage surges, and also to limit the single phase short circuit current upon a dead ground. My invention, however, has an entirely different object in view and operates in a different manner to secure a new result, namely, to prevent the formation of an intermittent or arcing ground, which if permitted to form will almost instantly develop into an arc of such proportions as to damage the system by surges or result in permanently grounding the line. According to my invention, the formation of such a destructive arc is prevented and not only are the high voltage surges eliminated but the fault is in nearly every instance permitted to clear itself without the development of a dead ground on the line.

My invention will be better understood from the following description taken in connection with the accompanying drawings and its scope will be pointed out in the appended claims.

Figure 2:
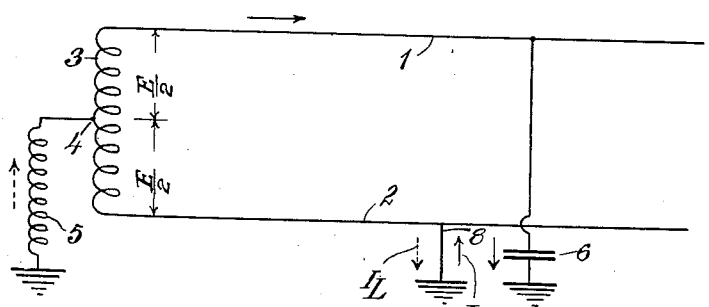
Figure 3:
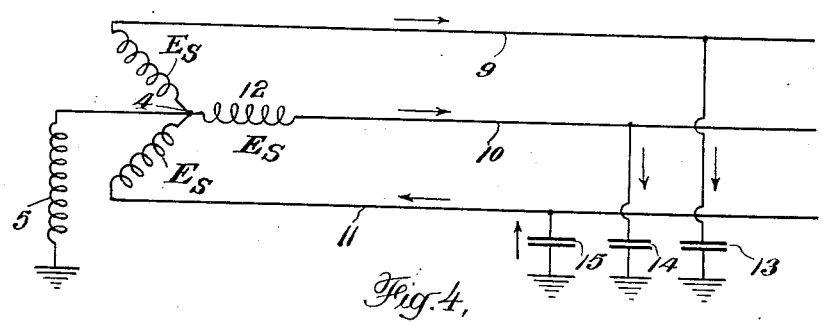
Figure 4:
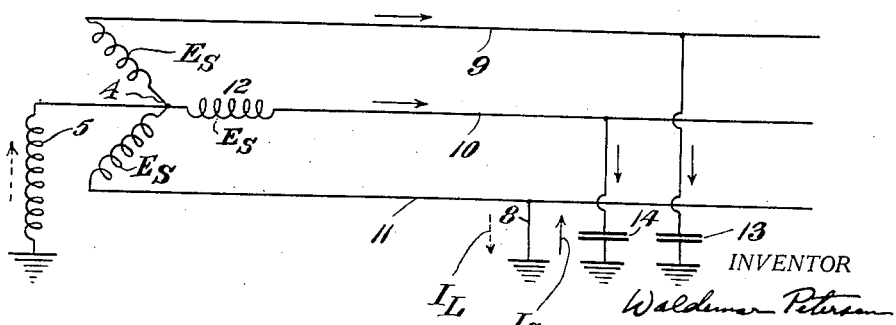

Figure 1 illustrates diagrammatically a single phase alternating current electric system embodying my invention; Fig. 2 is similar to Fig. 1 but illustrates conditions with an earth fault on one of the conductors of the system; Fig. 3 illustrates diagrammatically a polyphase alternating current electric system embodying my invention; Fig. 4 is similar to Fig. 3 but illustrates conditions with an earth fault on one of the conductors of the system; Figs. 5 and 6 illustrate diagrammatically alternating current electric systems embodying modifications of my invention; Fig. 7 illustrates diagrammatically a polyphase alternating current electric system comprising a plurality of line sections and embodying my invention; and Figs. 8 and 9 illustrate diagrammatically polyphase alternating current electric systems embodying modifications of my invention.

Referring now to the drawings, Figs. 1 and 2 illustrate diagrammatically an embodiment of my invention in a single phase alternating current electric system comprising phase conductors 1 and 2 connected to a source of supply such as a generator or transformer winding 3 having a neutral point 4 earthed through a connection 5 proportioned to have an inductance of a value hereinafter to be determined in accordance with my invention. The capacitances to earth of the conductors 1 and 2 are represented diagrammatically by condensers 6 and 7 respectively, the condenser 6 not showing in Fig. 2 as the conductor 2 is assumed to have an earth fault indicated at 8. The arrows in Figs. 1 and 2 represent the phase relations of the leading and lagging currents, the former being represented by full line arrows and the latter by broken line arrows. The capacitances to earth represented by condensers 6 and 7 for the respective conductors 1 and 2 may in actual practice differ for the different conductors due to the configuration of the circuit or non-symmetry of arrangement of the conductors with respect to ground, particularly in three phase systems, but for all practical purposes, the capacitances to earth of the different conductors may be assumed equal. If now E represents the phase operating or line to line voltage, then each of the conductors 1 and 2 differs from ground potential by an electromotive force of value $\frac{E}{2}$ and each of the conductors takes from the source 3 a charging current to earth leading the electromotive force of the source by 90°. Upon the occurrence of a fault to ground on one of the conductors 2, as indicated at 8 in Fig. 2, the conductor 1 differs from ground potential by an electromotive force E and conductor 2 is at ground potential. If, therefore, C represents the capacitance of conductor 1, that is to say, the capacitance to earth of one conductor and ω the frequency of the alternating current electric system in radians per second, then the earth fault current represented by $I_C$ which is the charging current to ground taken by the ungrounded conductor, leads the electromotive force E by 90° and is $I_C = E\omega C$. Upon the occurrence of the fault to earth, the potential of the neutral point 4 heretofore at ground potential now differs from ground potential by the electromotive force $\frac{E}{2}$ which being impressed on the inductive connection causes a lagging current represented by $I_L$ to flow and traverse the earth fault point in a direction opposed to the leading earth fault current $I_C$ since these two currents differ substantially 180° in phase relation. If L represents the inductance of the earthed connection 5, the lagging component of current in the earth fault is $$I_L = \frac{E}{2\omega L}.$$

If now the lagging component of current $I_L$ is made equal to the earth fault current $I_C$, the inductance L of the earth connection 5 necessary to annul or suppress the earth fault current $I_C$ is $$L = \frac{1}{2\omega^2 C}.$$

Therefore, with the earthed connection 5 proportioned to have an inductance of the value given by the above equation, the earth fault current is neutralized and the arc suppressed in its inception since the entire charging current to earth of the ungrounded conductors is annulled. The earth fault point, therefore, remains currentless and the arc is prevented from becoming intermittent since continuous current charges cannot be impressed on the system to accumulate and cause the excess voltages which in conjunction with the phase operating voltage maintain the arc cycle as heretofore explained.

Figs. 3 and 4 illustrate a three phase alternating current electric system embodying my invention and comprising phase conductors 9, 10 and 11 connected to a source of supply such as a transformer or generator indicated generally by 12 having in the case illustrated star or Y-connected windings which have a neutral point 4 earthed through a connection 5 proportioned to have an inductance of a value to be hereinafter determined in accordance with my invention. The capacitances to earth of the conductors 9, 10 and 11 are represented diagrammatically by condensers 13, 14 and 15, respectively, the condenser 15 not showing in Fig. 4 as the conductor 11 is assumed to have an earth fault as indicated at 8. The arrows in Figs. 3 and 4 indicate the phase relations of the leading and lagging currents as before. If now E represents the line to line or delta voltage and $E_s$ the star or Y voltage, then each of the conductors 9, 10 and 11 substantially differs from ground potential by the electromotive force $E_s$ and each of the conductors takes from the source 12 a charging current to earth leading the electromotive force $E_s$ of its phase by 90°. Upon the occurrence of a fault to ground on one of the conductors 11 as indicated at 8 in Fig. 4, conductors 9 and 10 differ from ground potential by the electromotive force E and conductor 11 is at ground potential. If, therefore, C as before represents the capacitance to ground of each of the ungrounded conductors 9 and 10, the earth fault current represented by $I_C$, which is the charging current to ground taken by the ungrounded conductors, leads the electromotive force $E_s$ between the neutral point and the grounded conductor, by 90° and is $I_C = 3 E_s \omega C$. Upon the occurrence of the fault to earth, the potential of the neutral point 4 heretofore at ground potential now differs from ground potential by the electromotive force $E_s$ which being impressed on the inductive connection causes a lagging current represented by $I_L$ to flow and traverse the earth fault point in a direction opposed to the leading earth fault current $I_C$ since these two currents differ 180° in phase. If L represents the inductance of the earthed connection 5, the lagging component of current in the earth fault is $$I_L = \frac{E_s}{\omega L}.$$

If as before, the lagging component of current $I_L$ is made equal to the earth fault current $I_C$ the inductance L of the earth connection 5 necessary to annul or suppress the earth fault current $I_C$ in its inception is $$L = \frac{1}{3\omega^2 C}.$$

An inductance of this magnitude, therefore, neutralizes the earth fault current at the voltage across the earth connection or inductive reactance 5 in accordance with my invention.

If the cause of the insulator flash-over disappears, the earth fault therefore disappears, but without the neutralization of the earth fault current, the earth fault would be maintained by the earth fault arc which would become intermittent and of increasing intensity as heretofore explained. At the instant the flash-over occurs, the voltage on the inductive connection is zero but as the arc is established voltage, star voltage in the case of a three phase system is impressed on the inductive connection and the lagging current quickly builds up to the value necessary to neutralize the leading earth fault current. During the brief period which it takes the lagging current to reach the value necessary to neutralize the earth fault current, there passes over the earth fault point a substantially oscillatory neutralizing current to earth which tends to heat and ionize the earth fault arc path so that, if after the extinction of the arc, the voltage of the earthed phase rose suddenly to its supply voltage, the previous ionization and heating would lead to reignition of the arc and the action of the arc would begin anew.

My invention, however, eliminates this danger since the parallel connected capacitances relative to earth of the system, in the case of Fig. 1 for example 2C, comprise in series connection with the inductance L of the earth connection, a resonant circuit having a frequency $$\omega = \sqrt{\frac{1}{2CL}}$$

which is the frequency of the alternating current electric system. In the case of Fig. 3, the capacitance 3C in series connection with the inductance L of the earth connection provides a resonant circuit having a frequency $$\omega = \sqrt{\frac{1}{3CL}}$$

which is the frequency of the system. Therefore, when the earth fault arc is extinguished, this resonant circuit is left to itself and the previously imposed oscillation is converted into a free proper oscillation in the circuit including the earth connection, and this oscillation slowly dies down. Consequently, the voltage in the previously earthed phase or conductor does not increase suddenly to its full supply value but slowly according to an exponential law and the danger of a reignition at the earth fault point is eliminated.

An exact balance between the leading and lagging components of current may be difficult to obtain in practical operation and there may at one time be a leading and at another time a lagging residual current at the earth fault point although this residual current whether lagging or leading will be of relatively low intensity. I may, therefore, increase the damping effect of the inductive earth connection by including in circuit therewith a resistance 16 either in parallel with the inductive connection 5 as illustrated in Fig. 5, or in parallel with parts thereof, or in series as illustrated in Fig. 6. By means of this additional damping effect, the leading or lagging residual current, as the case may be, is combined with a watt or in-phase current which greatly exceeds the residual reactive current and the phase displacement in the earth fault point is small. Therefore, the extinction of the arc will occur at substantially the same time the electromotive force of the grounded conductor is passing through its zero value so that the voltage tending to reignite the arc is small. This arrangement thus establishes a condition whereby the arc is readily extinguished even through there may be a residual reactive current at the earth fault point because of the practical difficulties in the way of obtaining a precise balance between the leading earth fault current and the lagging current of the inductive earth connection.

In the extensive alternating current electric transmission and distribution systems comprising a plurality of sections one or more of which may at times be out of service, it is clear that with the use of only one inductive earth connection the inductance thereof would have to be different to correspond with the variation in capacitance of the system. The capacitance of the system, of course, increases with the length of the circuit, that is to say, the number of sections in service, therefore, requiring less inductance to neutralize the leading earth fault current. Now if for some reason one or more sections are cut out of service, the capacitance decreases and more inductance is required in the earth connection. One way of securing the desired adjustment is to use a plurality of inductive connections to earth so distributed among the sections that each section has its own inductive connection with the inductance thereof proportioned in accordance with my invention to the earth capacitance of the section as illustrated, for example, in Fig. 7.

Referring now to Fig. 7, there are shown two sections A, A' comprising conductors 9, 10 and 11 and 9', 10' and 11' respectively of a three phase alternating current electric transmission and distribution system. As illustrated, the sections A, A' are arranged to be connected and disconnected in any suitable manner as, for example, by a circuit breaker 17. The capacitance to earth of the section A is indicated by the condensers 13, 14 and 15 and of the section A' by the condensers 13', 14' and 15'. For the earth connections of the sections, I may use the neutral point of a Y-delta connected grounding transformer or, as illustrated for section A, the neutral point 4 of the Y-connected primary windings of one of the sections network transformers 18 supplying the line B. The section A is thus earthed through the neutral point 4 and an inductive connection 5 proportioned in accordance with my invention to have an inductance of such a value as to neutralize the earth capacitance of the section A upon the occurrence of an earth fault on the system. Section A' is illustrated as having a neutral point 4' which may be established by any suitable grounding transformer, the one illustrated being well known to the art as a zig-zag auto-transformer and having a neutral point 4' earthed through an inductive connection 5' proportioned in accordance with my invention to have an inductance of such a value as to neutralize the earth capacitance of the section A' upon the occurrence of an earth fault on the system. Therefore, with this distributed arrangement of inductive earth connections, there are a plurality of parallel inductive paths to earth and the more paths, that is, the more sections in service and, therefore, the greater the capacitance of the system, the more lagging current supplied on the occurrence of an earth fault on the system. If, however, one or more sections are cut out of service, the capacitance is decreased and the number of parallel inductive paths to earth is decreased so that the lagging current supplied on the occurrence of an earth fault on the system is correctly proportioned to the leading earth fault current in accordance with my invention.

The neutralization of the earth fault current may also be effected, for example, as illustrated in Fig. 8 by induction coils 19, 20 and 21 connecting each of the phase conductors 9, 10 and 11 of a three phase system to earth, the coils 19, 20 and 21 being so proportioned as to balance the normal capacitances to earth represented by the condensers 13, 14 and 15 of the respective conductors, that is, the capacitances in undisturbed operation. Under normal operation, the voltage across each of the coils 19, 20, 21 is star or Y voltage which is the voltage effective in producing the charging currents taken by each of the conductors 9, 10 and 11, but upon the occurrence of an earth fault on one of the conductors, the voltage across the coils of each of the ungrounded conductors becomes delta voltage which is the voltage effective in producing the charging current to ground taken by the ungrounded conductors. The increase in the charging current is, therefore, compensated by the increased lagging currents of the coils in the change from Y to delta voltage. As compared with the arrangements heretofore described, this arrangement has several disadvantages since each of the coils 19, 20 and 21 must be insulated in a three phase system for full line to line or delta voltage, whereas the inductive connection to earth through a neutral point of the system has to be insulated only for the much smaller star or leg voltage. Moreover, the kv-a. capacity of the coils 19, 20 and 21 has to be in three phase systems several times that required for the inductive connection through a neutral point. Furthermore, the inductive connection through the neutral point can be made relatively small as it carries current only temporarily and, therefore, calls for a short time rating. Also, with the coils arranged as shown in Fig. 8 the leading capacity or charging current of the system is neutralized in normal operation and the system is, therefore, robbed of the economically important possibility of compensating the lagging load currents of the system by the leading charging currents.

It is also possible, as shown in Fig. 9, to modify the arrangement shown in Fig. 8 such that an artifically formed neutral point 22 of a plurality of induction coils 19, 20, 21 neither magnetically nor electrically interlinked are connected to earth through another induction coil 23, the coils being so proportioned as to substantially neutralize the leading earth fault current upon the occurrence of an earth fault on the system.

Although I have shown and described my invention in considerable detail, I do not wish to be limited to the specific details thereof, as shown and described, but may use such modifications, substitutions, or equivalent thereof as are embraced within the spirit of my invention.

What I claim as new and desire to secure by Letters Patent of the United States, is,—

1. In a high tension electric system, an alternating current apparatus having a neutral point, and an inductance connected between said neutral point and the ground and being dimensioned electrically substantially to neutralize the capacity current to ground of the ungrounded part of the system, whereby, upon grounding the system, the earth current is substantially suppressed at the point of breakdown.

2. In a high tension electric system, an alternating current apparatus having a neutral point, an inductance connected between said neutral point and the ground and being dimensioned electrically substantially to neutralize the capacity current to ground of the ungrounded part of the system, and a resistance in the circuit of the inductance whereby to increase the damping characteristic of the circuit.

3. In a high tension electric system, an inductance which grounds a point of the system and is so dimensioned electrically as to take up upon grounding of one phase of the system a current which substantially neutralizes the resultant capacity current flowing to earth over the ungrounded phase of the system.

4. In a high tension electric system, an inductance which grounds a neutral point of the system and is so dimensioned electrically as to take up upon grounding of a phase of the system a current which substantially neutralizes the resultant capacity current flowing to earth over the ungrounded phase of the system.

5. In a high tension electric system, an inductance which grounds a point of the system and is so dimensioned electrically as to take up upon grounding of one phase of the system a current which substantially neutralizes the resultant capacity current flowing to earth over the ungrounded phase of the system, and a resistance connected in circuit with said inductance whereby to increase the damping effect of the circuit comprising said inductance.

6. An alternating current electric system having a grounded neutral point, characterized by the fact that the inductance of the circuit through the ground connection is such as to form with the earth capacitance of the system a resonant circuit substantially tuned to the normal frequency of the system, whereby upon the occurrence of an earth fault on the system the earth fault current is suppressed.

7. An alternating current electric system comprising a plurality of conductors each normally differing from ground potential, and inductive connection through a neutral point of said system to ground, the reactance of said inductive connection being such that the lagging component of the current therein upon the occurrence of an earth fault is substantially equal to the charging current to earth taken by the ungrounded conductor or conductors whereby the earth fault current is suppressed.

8. An alternating current electric system, and an inductive connection between a neutral point of said system and earth, the reactance of said inductive connection being of such a value as to form with the earth capacitance of the system a resonant circuit substantially tuned to the normal frequency of the system whereby upon the occurrence of an earth fault on the system the earth fault current is suppressed.

9. An alternating current electric system comprising a plurality of conductors each normally differing from ground potential and earthed through a neutral point of the system, and a resistance in circuit with said earth connection, the inductance of the circuit through the earth connection being substantially tuned for resonance at the normal frequency of the system, whereby upon the occurrence of an earth fault on the system the earth fault current due to the charging current to earth taken by the ungrounded conductor or conductors is neutralized.

10. An alternating current electric transmission and distribution system comprising a source of electromotive force, a plurality of phase conductors each normally differing from ground potential and connected to ground through a neutral point of the system, and a resistance in circuit with the ground connection, the inductance of the ground connection being such that the lagging component of current therein due to the electromotive force of the source upon the occurrence of a fault to ground on one of the conductors of the system substantially neutralizes the charging current to earth taken by the ungrounded conductor or conductors whereby the earth fault current is suppressed.

11. An alternating current electric transmission and distribution system comprising a source of electromotive force, a plurality of phase conductors each normally differing from ground potential, means for establishing a neutral point on said system, an inductive connection between said neutral point and ground, the reactance of said inductive connection being such that the lagging component of current therein due to the electromotive force of the source, upon the occurrence of an earth fault on one of the conductors of the system, substantially neutralizes the charging current to earth, taken by the ungrounded conductor or conductors, whereby the earth fault charging current is suppressed.

In testimony whereof I affix my signature.

WALDEMAR PETERSEN.

Witnesses:
F. H. ANDERSON,
C. C. L. B. WYLES.